(12) United States Patent
Armangau et al.

(10) Patent No.: US 9,934,163 B1
(45) Date of Patent: Apr. 3, 2018

(54) SELECTIVELY DELAYING CACHE FLUSHING TO PROMOTE WRITE EFFICIENCY

(71) Applicant: EMC IP Holding Company LLC, Hopkinton, MA (US)

(72) Inventors: Philippe Armangau, Acton, MA (US); Chris Seibel, Walpole, MA (US); Henry Austin Spang, IV, Hopkinton, MA (US); David John Agans, Wilton, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/282,538

(22) Filed: Sep. 30, 2016

(51) Int. Cl.
*G06F 12/128* (2016.01)
*G06F 12/0808* (2016.01)

(52) U.S. Cl.
CPC ........ *G06F 12/128* (2013.01); *G06F 12/0808* (2013.01); *G06F 2212/621* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 9,619,160 B2 * | 4/2017 | Patel | G06F 3/0619 |
| 2003/0217080 A1 * | 11/2003 | White | G06F 3/061 |
| 2007/0143563 A1 * | 6/2007 | Pudipeddi | G06F 3/0607 |
| | | | 711/173 |
| 2007/0220406 A1 * | 9/2007 | Gubbi | H03M 13/1515 |
| | | | 714/776 |
| 2010/0306444 A1 * | 12/2010 | Shirley | G06F 12/0802 |
| | | | 711/6 |
| 2015/0193156 A1 * | 7/2015 | Patel | G06F 11/1471 |
| | | | 711/103 |
| 2015/0193337 A1 * | 7/2015 | Kimmel | G06F 12/0802 |
| | | | 711/103 |
| 2015/0193338 A1 * | 7/2015 | Sundaram | G06F 3/0688 |
| | | | 711/103 |
| 2015/0378618 A1 * | 12/2015 | Lipcon | G06F 17/30138 |
| | | | 709/226 |
| 2017/0220777 A1 * | 8/2017 | Wang | G06F 19/366 |

* cited by examiner

*Primary Examiner* — Sean D Rossiter
(74) *Attorney, Agent, or Firm* — BainwoodHuang

(57) ABSTRACT

A technique for managing storage in a data storage system includes ingesting host data into a data log backed by pages in a cache. The host data are addressed to specified locations in a data object stored in persistent storage devices. When mapping pages in cache to respective target locations in the persistent storage devices, a flag is selectively asserted to indicate whether there is contiguous free space at the target locations. The cache responds to the flag by delaying flushing of flagged pages, which provides more time for the cache to aggregate pages that map to contiguous free space. Meanwhile, pages that are not flagged can be flushed more quickly, enabling the cache to operate efficiently even though flushing of some pages is delayed.

20 Claims, 3 Drawing Sheets

SELECTIVELY DELAYING CACHE FLUSHING TO PROMOTE WRITE EFFICIENCY

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

In some arrangements, a data storage system includes a cache, which enables the data storage system quickly to acknowledge write requests arriving from hosts. For example, the data storage system may store a data object and receive an IO (Input/Output) request specifying data to be written to a specified location in that data object. Rather than writing the data to the specified location directly, which may entail delays for mapping, spinning up disk drives, and so forth, the data storage system instead writes the data to cache. The cache may be implemented in fast, semiconductor memory, such that the write to cache occurs very quickly. Once the data storage system confirms that the host data are securely stored in the cache, the data storage system may send an acknowledgement back to the originating host, to confirm that the write has been completed. Later, out of band with the write request, the data storage system maps the data to its target location and stores the data in persistent storage devices, such as magnetic disk drives, electronic flash drives, and so forth. The use of the cache therefore enables the data storage system to respond much more quickly to host writes than it would if it had to perform mapping and storage to disk in-line with IO requests.

SUMMARY

Efforts are underway to develop data storage systems that include cache-implemented data logs. According to some examples, a data log ingests incoming host data and stores the data in pages of semiconductor cache, enabling quick acknowledgements back to originating hosts. The host data are directed to a data object, which the data storage system backs using persistent storage devices, such as magnetic disk drives. Out of band with particular IO requests, the data log performs "rename" operations, which include identifying mapped, target locations of ingested host data in the storage devices. In such arrangements, the cache itself may operate asynchronously with the rename operations, flushing to underlying storage devices on its own schedule, independently of when rename operations occur.

In some examples, the cache may aggregate pages that the rename operations have mapped to contiguous ranges of storage. Unfortunately, the lack of synchronization between renaming and flushing can undermine the ability of the cache to aggregate pages. For example, aggregation may attempt to assemble a group of cache pages that renaming operations have mapped to a particular range of contiguous storage, but the cache may flush some pages in the group before all the pages mapping to that range are available. As a consequence, what could have been a sequential write to disk becomes fragmented. Also, one or more additional writes to the same disk range may be needed to fill in pages that are not renamed until after the initial flush. Such additional writes may have to wait in line for earlier writes to complete before they may be started. Further, each subsequent write to the range may require a disk read, to avoid overwriting contents that were previously written. Thus, the inability of the cache to fully aggregate writes to a contiguous range of disk space results in degraded performance compared with what would be possible if the cache could aggregate writes more completely.

In contrast with prior approaches, an improved technique for managing storage in a data storage system includes ingesting host data into a data log backed by pages in a cache. The host data are addressed to specified locations in a data object stored in persistent storage devices. When mapping pages in cache to respective target locations in the persistent storage devices, the technique selectively asserts a flag to indicate whether there is contiguous free space at the target locations. The cache responds to the flag by delaying flushing of flagged pages, which provides more time for the cache to aggregate pages that map to contiguous free space. Meanwhile, pages that are not flagged can be flushed more quickly, enabling the cache to operate efficiently even though flushing of some pages is delayed.

Certain embodiments are directed to a method of managing write requests in a data storage system. The method includes receiving IO (Input/Output) requests specifying writes of host data to identified portions of a data object and ingesting the host data into a data log. The data log stores the host data in a set of pages of a cache. The method further includes performing a rename operation on each of the set of pages in the cache. Each such rename operation (i) identifies a target location in persistent storage to which that page will be flushed and (ii) provides a coalesce-expected flag for that page to indicate whether the persistent storage has contiguous free space at the target location. For each of the set of pages for which the coalesce-expected flag is asserted, the method still further includes processing that page for delayed flushing from the cache to the respective target location. The delayed flushing provides more time prior to flushing for the cache to aggregate contiguous writes than would be available if the page were processed for less-delayed flushing.

Other embodiments are directed to a data storage system constructed and arranged to perform a method of managing write requests, such as the method described above. Still other embodiments are directed to a computer program product. The computer program product stores instructions which, when executed on control circuitry of a data storage system, cause the data storage system to perform a method of managing write requests, such as the method described above.

The foregoing summary is presented for illustrative purposes to assist the reader in readily grasping example features presented herein; however, it is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing storage in a data storage system includes ingesting host data into a data log backed by pages in a cache. The host data are addressed to specified locations in a data object stored in persistent storage devices. When mapping pages in the cache to respective target locations in the persistent storage devices, the improved technique selectively asserts a flag to indicate whether there is contiguous free space at the target locations. The cache responds to the flag by delaying flushing of flagged pages, which provides more time for the cache to aggregate pages that map to contiguous free space.

Figure 1:
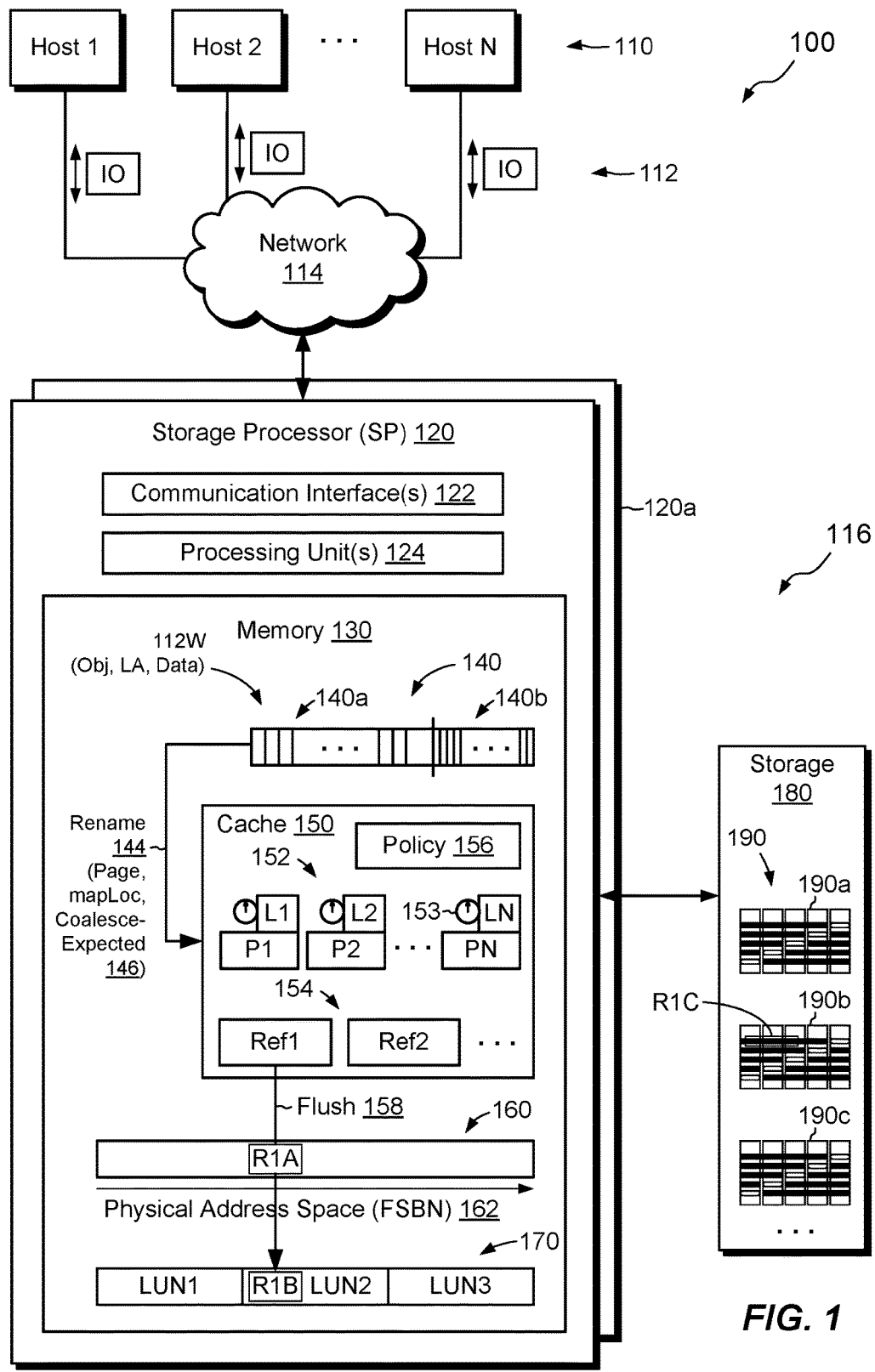
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180, such as magnetic disk drives, electronic flash drives, and the like. In an example, the storage 180, or portions thereof, are arranged in RAID groups 190. "RAID" is an acronym for "Redundant Array of Independent (or Inexpensive) Disks." Three RAID groups 190a, 190b, and 190b are specifically shown, although any number of RAID groups may be provided. Each RAID group 190 is seen to include five disk drives, e.g., in a RAID 5 configuration with single, rotating parity. This is merely an example, however, as RAID groups may be provided in any configuration and in any case are not strictly required.

The data storage system 116 may include multiple SPs like the SP 120 (e.g., a second SP 120a). In an example, multiple SPs may be provided as circuit board assemblies, or "blades," which plug into a chassis that encloses and cools the SPs. It is understood, however, that no particular hardware configuration is required, as the data storage system 116 may include any number of SPs, including a single SP, and the SP 120 can be any type of computing device capable of processing host IOs.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

As further shown in FIG. 1, the memory 130 "includes," i.e., realizes by execution of software instructions, a data log 140, cache 150, and a file system 160. The data log 140 has a first region arranged to store log entries 140a and a second region arranged to store corresponding log descriptors 140b. Each log entry 140a stores a set of incoming host data. A log descriptor 140b corresponding to that log entry 140b stores information about that log entry 140a, such as a logical address (LA) to which the host data stored in that log entry is directed, the location of the data entry 140a in the data log 140, and an identifier of a cache page 152 to which the host data for that log entry are cached.

In an example, the data log 140 arranges data entries 140a in a circular queue, with new data entries appended to a tail of the queue and old entries removed from a head. In some examples, the data log 140 is denominated in block-sized increments. As will be described, a "block" is the smallest unit of addressable storage in the file system 160. Typical blocks sizes are 4 KB or 8 KB, for example, although block sizes may vary.

Cache 150 provides physical storage for host data written to the data log 140. The cache 150 may be implemented, for example, using semiconductor memory, such as DRAM (Dynamic Random Access Memory). In a particular example, the DRAM is battery-backed on SP 120 and mirrored to a similar, battery-backed cache on SP 120a, such that data written to cache 150 may be considered persistent, even though it may be composed of volatile memory. For example, the cache 150 may retain its contents even if power fails or an SP encounters a system panic.

Cache 150 is seen to include multiple pages 152, i.e., P1 through PN, where "N" is typically hundreds or thousands or more. Each page 152 has an associated location identifier, i.e., L1 through LN. The location identifier for each page specifies a respective destination in storage. Location identifiers may be updated during cache processing. When the cache 150 flushes a page, it sends the page's contents to the destination indicated by the respective location identifier in place at the time of flushing. In an example, each location identifier is specified in the form of a LUN (Logical Unit Number, identifying a logical disk) and an offset range into that LUN.

Each cache page 152 may be associated with a clock 153. In an example, each clock 153 specifies a rate at which the respective page 152 is to be aged. For instance, the cache 150 may direct some pages 152 to age faster than others, and others to age slower. A flushing policy 156 may require that the cache 150 flush older pages 152 before flushing younger ones. The effect of variable aging is that the cache 150 keeps slower-aging pages in cache longer than it keeps faster-aging pages. In a particular example, the cache 150 supports multiple tracks, e.g., Track 0, Track 1, Track 2, etc. Each cache page 152 is assigned to a respective track, and each track ages pages 152 at a different rate. One should appreciate that the depiction of clocks 153 is intended to show in a conceptual way that pages 152 can age at different rates. How this is accomplished is a matter of implementation, and there is no requirement that each page have its own, actual clock.

The cache 150 is further seen to include reference structures 154. Reference structures 154, or simply "references," are metadata structures that aggregate cache pages 152. The data storage system 116 creates references in such a way that each reference corresponds, one-to-one, with a respective range of contiguous blocks in underlying storage, e.g., an eight-block range. References 154 aggregate pages based on location identifiers. For example, each reference 154 aggregates pages 152 whose location identifiers point to locations that fall within the particular contiguous range of storage to which that reference corresponds. The cache 150 may flush all pages aggregated by a reference together at the same time, thereby promoting contiguous writes.

As further shown in FIG. 1, file system 160 has a physical address space 162, which may range, for example, from zero to some large number. Each address in the range 162 specifies a respective block location in the file system 160, with each physical address designated by File System Block Number, or "FSBN." In an example, the file system 160 stores a data object, e.g., in the form of a file within the file system 160. The file (not show) may be an ordinary file, or it may be a container file, i.e., one that contains a more complex structure, such as a LUN, another file system, a virtual machine disk, and so forth. The data object stored in the file may thus be simple or complex. In an example, the data log 140 is dedicated to a single data object, with all data ingested by the data log 140 limited to host data directed to that data object.

In an example, the file system 160 is backed by a collection of LUNs 170. Three LUNs, LUN1, LUN2, and LUN3, are shown. In an example, each of these LUNs 170 corresponds to and provides an interface to a respective RAID group 190. For example, LUN1 provides an interface to RAID group 190a, LUN2 provides an interface to RAID group 190b, and LUN3 provides an interface to RAID group 190c. By reading or writing a range in any of these LUNs 170, the data storage system 116 effects a read or write to a corresponding range in the respective RAID group 190.

In an example, the data storage system 116 maintains correspondences between references 154 in cache 150, regions in the file system 160, regions in the LUNs 170, and physical storage locations in the RAID groups 190. For example, reference Ref1 aggregates cache pages whose locations correspond to (i) a contiguous region R1A in file system 160, (ii) a contiguous region R1B in LUN2, and (iii) a contiguous region R1C in RAID group 190b. Other references in cache 150 have similar correspondences with contiguous regions in the file system 160, contiguous regions in the LUNs 170, and contiguous regions in the RAID groups 190. These correspondences ensure that flushing 158 a reference 154 to a particular LUN 170 effects a write to a corresponding range in a RAID group 190 and places the flushed data in a corresponding range of the file system 160.

In example operation, the hosts 110 issue IO requests 112 to the data storage system 116. The requests 112 include requests 112W, which specify writes of host data to a particular data object (Obj) at a particular logical address range (LA) relative to that object. The SP 120 receives the IO requests 112W at the communication interfaces 122 and initiates further processing. For example, data log 140 ingests host data specified by requests 112W, e.g., by creating new log entries 140a for the newly arriving data and creating new log descriptors 140b, one for each new log entry. When creating a new log entry 140a, the data log 140 writes the new host data to an available page 152 in cache 150, and writes an identifier of that cache page in a corresponding log descriptor 140b. In an example, the data log 140 is denominated in block-size increments (e.g., 8 KB), and each cache page 152 has the same size (e.g., 8 KB). The data log 140 may ingest many host writes in this manner. In an example, once host data for a request 112W are stored in a cache page (and optionally mirrored to cache on SP 120a), the data storage system 116 may acknowledge the write back to the originating host 110, to confirm that the write is complete.

Out of band with incoming write requests 112W, the data log 140 may send rename requests 144 to cache 150 for performing rename operations on respective log entries 140a. Each rename request (i) identifies a target location in persistent storage to which the host data in the respective log entry should be flushed, (ii) specifies a write of that target location to the location identifier (e.g., L1, L2, etc.) for the respective cache page 152, and (iii) sends a coalesce-expected flag 146 to the cache 150, to indicate whether the persistent storage has contiguous free space at the target location. In an example, identifying the target location involves accessing metadata of the file system 160 to look up the physical address (FSBN) at which storage space for the addressed portion of the data object has been allocated.

Based on the correspondences described above, each FSBN in the file system 160 directly implies a corresponding offset into an underlying LUN 170 and a corresponding location in an underlying RAID group 190, which resolves to a location on one or more disk drives. In an example, the cache 150 writes the target location into a location identifier, by providing the LUN and offset range that corresponds to the mapped FSBN. Writing to the location identifier for a page has the effect of redirecting the target of flushing for that page from an original location to a new, mapped location, which may provide a proper and correct destination for the host data in the structure of the file system 160.

In an example, a coalesce-expected flag 146 is provided with each rename request 144. The data log 140 asserts the coalesce-expected flag 146 (e.g., sets it to TRUE) when free space is found at the target location and de-asserts the flag (e.g., sets it to FALSE) otherwise. In a particular example, the coalesce-expected flag 146 may be asserted in response to (i) the file system 160 allocating a new block to accommodate the write and (ii) the file system confirming that it contains areas (i.e., "windows;" see below) of contiguous free space. This is merely an example, however, as any suitable test may be performed that informs the cache 150 that coalescing (aggregating) of writes to contiguous locations is expected. One should appreciate that the coalesce-expected flag 146 is not a command to the cache 150 but rather a "hint," i.e., a piece of information that establishes a preference as to how the cache 150 should operate.

In response to the coalesce-expected flag 146 being asserted in a rename request 144, the cache 150 marks the page 152 (i.e., the one indicated in the request 144) for delayed flushing. For example, the cache 150 places the page 152 on a track that causes the page to age more slowly than it would if placed on a faster track. As the page ages more slowly, it tends to stay in cache 150 longer before being flushed, providing more time for additional pages to be renamed to locations covered by the same reference 154. The delay thus allows time for more pages to aggregate (coalesce) in a reference 154 and increases the chances that the reference 154 will completely fill, i.e., that all of its positions will be occupied by contiguously mapped pages. Once the reference fills (e.g., points to eight mapped pages), the cache 150 places each of the pages in that reference on a faster-aging track, so they can be flushed more quickly. Although there is a benefit to keeping the pages of a reference in cache until the reference is full, there is generally little further benefit to keeping the pages in cache after the reference becomes full.

When the coalesce-expected flag 146 is not asserted in a rename request 144, the cache 150 may process the identified page for less-delayed flushing. For example, the cache 150 may place the page 152 on a track that causes the page to age more quickly than it would if it were placed on a slower-aging track. As coalescing of contiguous writes is not expected in this case, there is no need to hold the page in cache 150 for extra time. The page can thus be flushed promptly with no negative impact.

As previously stated, flushing 158 from cache 150 proceeds asynchronously and out of band with rename operations. For example, the cache 150 may flush on a regular schedule, in response to becoming full, and/or based on other circumstances or actions.

In the manner described, the coalesce-expected flag 146 delays flushing from pages 152 in cache 150 to enable more renamed pages to accumulate in a reference 154. The likelihood is therefore increased that a reference 154 will fill before it is flushed, such that a contiguous write to underlying storage can be achieved. Although each reference 154 as described herein refers to only eight blocks of storage, for example, the effect of delayed flushing applies to all references 154 pointing to flagged pages. It is therefore common and expected that delayed flushing will affect many references 154 in cache, thereby increasing the likelihood that writes spanning multiple contiguously-mapped references 154 can be achieved. For example, if enough references 154 that map to contiguous storage ranges can be filled prior to flushing, the storage 180 may be able to achieve full-stripe writes to underlying RAID groups. As is known, full-stripe writes are highly efficient ways of writing to magnetic disk drives. By promoting contiguous writes at the reference level, the coalesce-expected flag 146 also promotes full-stripe writes at the disk drive level, further improving performance.

Figure 2:
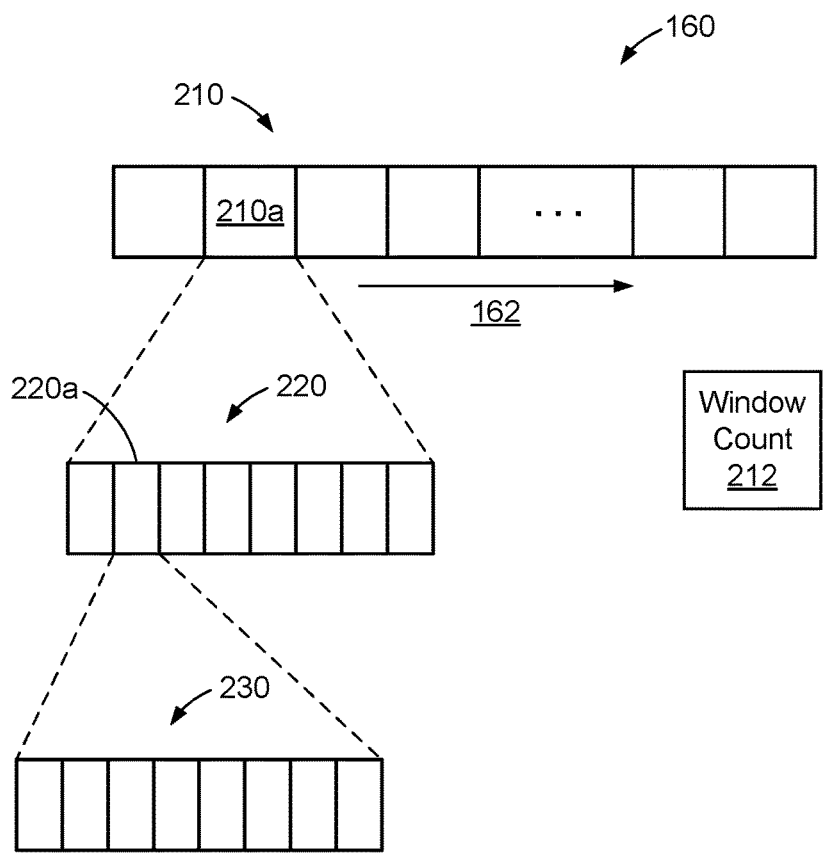
FIG. 2 is a block diagram of an example file system of FIG. 1, where the file system includes multiple windows, each window includes multiple reference regions, and each reference region includes multiple blocks.

FIG. 2 shows an example organization of the file system 160. Here, at least some portions of the physical address range 162 of file system 160 are rendered as "windows" 210, i.e., ranges of contiguous physical addresses. In an example, each window 210 has a size that corresponds to the size of a full stripe in a RAID group 190 backing that window 210, such that a write of the entire window's contents effects a full-stripe write to the RAID group. An example window size is 512 KB, which corresponds to 64 8 KB blocks. Windows 210 may be arranged contiguously in the file system 160 and may be tracked by file system metadata. For example, window count metadata 212 provides a count of available windows, i.e., the number of windows in the file system 160 that are "free," i.e., that contain no allocated blocks. In an example, the data log 140 refers to the window count metadata 212 in generating the coalesce-expected flag 146. For example, if the count is greater than zero and a rename operation requires a block to be allocated, the data log 140 sets the coalesce-expected flag 146 to TRUE. Otherwise, it sets to the coalesce-expected flag 146 to FALSE.

In the example shown, a window 210 is composed of multiple reference regions 220. Each reference region 220 corresponds to a respective reference structure 154 in cache 150 (FIG. 1). For example, when the cache 150 flushes the pages 152 of a reference structure 154, the flushed pages are flushed to storage locations that back a corresponding reference region 220. In an example, each reference region 220 contains eight blocks 230 (as shown for reference region 220a), which correspond to the eight pages 152 to which each reference structure 154 can point.

Figure 3:
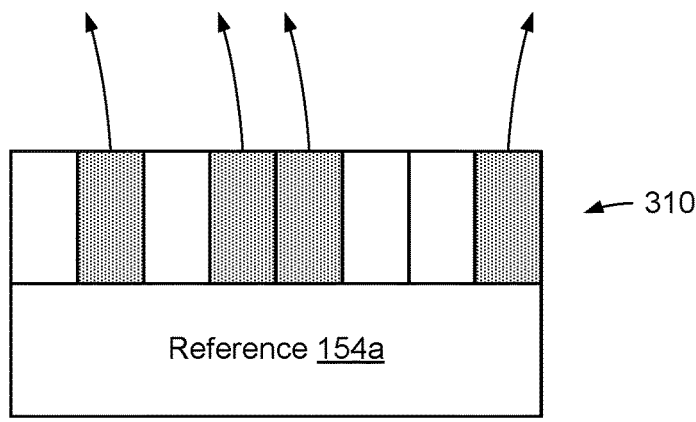
FIG. 3 is a block diagram of an example reference structure operating in a cache of FIG. 1, where the reference structure points to and aggregates multiple cache pages that map to a particular reference region in the file system.

FIG. 3 shows an example reference structure 154a, which is intended to be representative of reference structures 154 of FIG. 1. Here, reference structure 154a includes eight pointers 310, one for each page to which the reference 154a may point. By the relationships described above, each of the eight pointers 310 corresponds to a particular block location (FSBN) within a reference region 220. Shaded pointers point to cache pages that have been renamed. Delayed flushing of the reference 154a allows time for more pointers to point to renamed pages. By the time that pages pointed to by reference 154a are flushed, it is expected that reference 154a will be full, i.e., that each pointer 310 will point to a renamed page.

Figure 4:
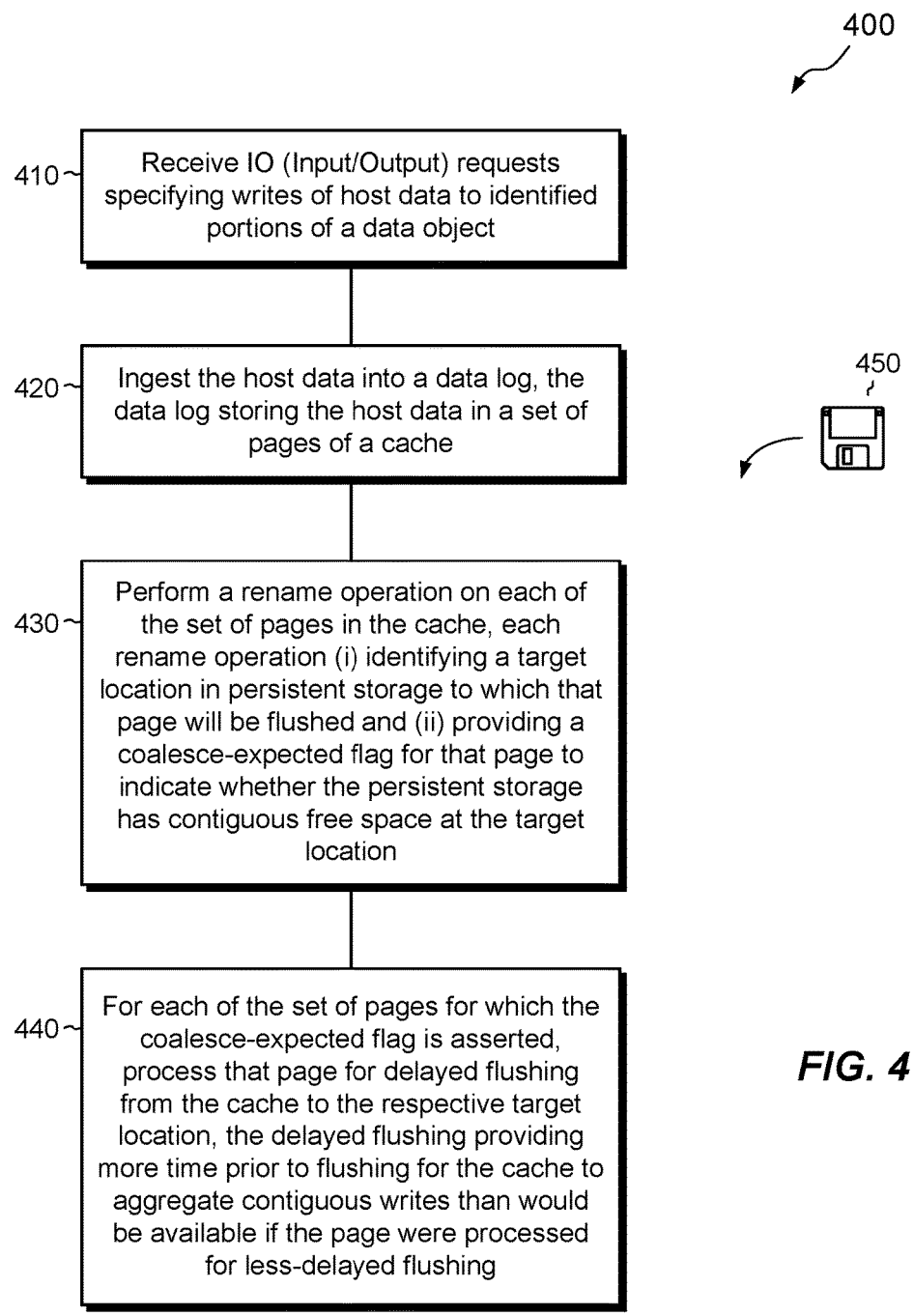
FIG. 4 is a flowchart showing an example method for managing write requests in a data storage system.

FIG. 4 shows an example method 400 that may be carried out in connection with the environment 100. The method 400 is typically performed, for example, by the software constructs described in connection with FIG. 1, which reside in the memory 130 of the storage processor 120 and are run by the set of processors 124. The various acts of method 400 may be ordered in any suitable way. Accordingly, embodiments may be constructed in which acts are performed in orders different from that illustrated, which may include performing some acts simultaneously.

At 410, a data storage system 116 receives IO (Input/Output) requests 112W specifying writes of host data to identified portions of a data object. For example, each write request 112W identifies host data to be written, a data object to which the host data is directed, and a logical address within that data object where the data is to be written.

At 420, the host data are ingested into a data log. The data log stores the host data in a set of pages of a cache. For example, the data log 140 is a logical structure, arranged as a circular queue, and the host data tracked by the data log 140 are stored in pages 152 of the cache 150, which may be implemented, for example, in DRAM.

At 430, a rename operation (resulting from request 144) is performed on each of the set of pages 152 in the cache 150. Each rename operation (i) identifies a target location (mapLoc) in persistent storage (e.g., disk drives arranged in RAID groups 190 and expressed as LUNs 170) to which that page will be flushed and (ii) provides a coalesce-expected flag 146 for that page to indicate whether the persistent storage has contiguous free space at the target location.

At 440, each of the set of pages for which the coalesce-expected flag 146 is asserted is processed for delayed flushing from the cache 150 to the respective target location. The delayed flushing provides more time prior to flushing 158 for the cache 150 to aggregate contiguous writes than would be available if the page were processed for less-delayed flushing.

An improved technique has been described for managing storage in a data storage system 116. The technique includes ingesting host data into a data log 140 backed by pages 152 in a cache 150. The host data are addressed to specified locations (e.g., logical addresses) in a data object stored in persistent storage devices (e.g., RAID groups 190). When mapping pages 152 in cache 150 to respective target locations in the persistent storage devices, the technique selectively asserts a flag 146 to indicate whether there is contiguous free space at the target locations. The cache 150 responds to the flag 146 by delaying flushing of flagged pages, which provides more time for the cache 156 to aggregate pages that map to contiguous free space. Meanwhile, pages that are not flagged can be flushed more quickly, enabling the cache 150 to operate efficiently even though flushing of some pages is delayed.

Having described certain embodiments, numerous alternative embodiments or variations can be made. For example, although embodiments have been described in which a data object is stored in a file system 160, this is merely an example. For instance, alternative embodiments may require no file system 160.

Also, although windows 210, reference regions 220, and blocks 230 are shown and described, alternative embodiments may be constructed that store host data in different increments from those shown. In addition, the particular sizes provided for windows 210, reference regions 220, and blocks 230 are merely examples.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 450 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing write requests in a data storage system, the method comprising:
   receiving IO (Input/Output) requests specifying writes of host data to identified portions of a data object;
   ingesting the host data into a data log, the data log storing the host data in a set of pages of a cache;
   performing a rename operation on each of the set of pages in the cache, each rename operation (i) identifying a target location in persistent storage to which that page will be flushed and (ii) providing a coalesce-expected flag for that page to indicate whether the persistent storage has contiguous free space at the target location; and
   for each of the set of pages for which the coalesce-expected flag is asserted, processing that page for delayed flushing from the cache to the respective target location, the delayed flushing providing more time prior to flushing for the cache to aggregate contiguous writes than would be available if the page were processed for less-delayed flushing.

2. The method of claim 1, further comprising, for each of the set of pages for which the coalesce-expected flag is not asserted, processing that page for less-delayed flushing from the cache to the respective target location.

3. The method of claim 2, further comprising:
   aggregating a predetermined number of pages for which the coalesce-expected flag is asserted and for which respective rename operations identify target locations in the persistent storage that are contiguous; and
   once the predetermined number of pages have been aggregated, processing each of the aggregated pages going forward for less-delayed flushing from the cache to the respective target locations.

4. The method of claim 3,
   wherein the cache employs a flushing policy that directs the cache to flush pages based on age, such that the cache flushes older pages before it flushes younger pages, and
   wherein processing a page for delayed flushing causes the page to age at a slower rate whereas processing a page for less-delayed flushing causes the page to age at a faster rate.

5. The method of claim 4,
   wherein the data storage system stores the data object in a file system, the file system having a physical address space backed by the persistent storage, and wherein each of a set of ranges of contiguous physical addresses in the file system is backed by a respective range of contiguous storage locations in the persistent storage.

6. The method of claim 4, wherein identifying the target location to which each of the set of pages will be flushed includes mapping a logical address to which host data in that page is directed to a corresponding physical address in the file system at which that host data will be placed.

7. The method of claim 6,
wherein at least a portion of the file system is rendered as a set of windows, each window including a range of contiguous physical addresses in the file system backed by a corresponding range of contiguous storage locations in the persistent storage, and
wherein providing the coalesce-expected flag for a page includes asserting the coalesce-expected flag in response to the physical address in the file system to which that page is mapped residing within a window that has free space.

8. The method of claim 7,
wherein the cache arranges pages into groups using reference structures, each reference structure pointing to multiple pages and aligning with a respective range of contiguous physical address space in the file system, and
wherein the method further includes flushing pages pointed to by a reference structure by flushing all pages pointed to by that reference structure together at one time.

9. The method of claim 8, wherein a reference structure is made to point to a cache page in response to performing a rename operation on that cache page that identifies a mapped location in the file system to which that reference structure is aligned, and wherein the reference structure is made to point to additional cache pages over time as additional rename operations map pages to other physical addresses to which that reference structure is aligned.

10. A data storage system, comprising control circuitry that includes a set of processing units coupled to memory, the control circuitry constructed and arranged to:
receive IO (Input/Output) requests specifying writes of host data to identified portions of a data object;
ingest the host data into a data log, the data log storing the host data in a set of pages of a cache;
perform a rename operation on each of the set of pages in the cache, each rename operation (i) identifying a target location in persistent storage to which that page will be flushed and (ii) providing a coalesce-expected flag for that page to indicate whether the persistent storage has contiguous free space at the target location; and
for each of the set of pages for which the coalesce-expected flag is asserted, processing that page for delayed flushing from the cache to the respective target location, the delayed flushing providing more time prior to flushing for the cache to aggregate contiguous writes than would be available if the page were processed for less-delayed flushing.

11. The data storage system of claim 10, wherein the control circuitry is further constructed and arranged to:
aggregate a predetermined number of pages for which the coalesce-expected flag is asserted and for which respective rename operations identify target locations in the persistent storage that are contiguous; and
once the predetermined number of pages have been aggregated, process each of the aggregated pages going forward for less-delayed flushing from the cache to the respective target locations.

12. A computer program product including a set of non-transitory, computer-readable media having instructions which, when executed by control circuitry of a data storage system, cause the control circuitry to perform a method for managing write requests, the method comprising:
receiving IO (Input/Output) requests specifying writes of host data to identified portions of a data object;
ingesting the host data into a data log, the data log storing the host data in a set of pages of a cache;
performing a rename operation on each of the set of pages in the cache, each rename operation (i) identifying a target location in persistent storage to which that page will be flushed and (ii) providing a coalesce-expected flag for that page to indicate whether the persistent storage has contiguous free space at the target location; and
for each of the set of pages for which the coalesce-expected flag is asserted, processing that page for delayed flushing from the cache to the respective target location, the delayed flushing providing more time prior to flushing for the cache to aggregate contiguous writes than would be available if the page were processed for less-delayed flushing.

13. The computer program product of claim 12, wherein the method further comprises, for each of the set of pages for which the coalesce-expected flag is not asserted, processing that page for less-delayed flushing from the cache to the respective target location.

14. The computer program product of claim 13, wherein the method further comprises:
aggregating a predetermined number of pages for which the coalesce-expected flag is asserted and for which respective rename operations identify target locations in the persistent storage that are contiguous; and
once the predetermined number of pages have been aggregated, processing each of the aggregated pages going forward for less-delayed flushing from the cache to the respective target locations.

15. The computer program product of claim 14,
wherein the cache employs a flushing policy that directs the cache to flush pages based on age, such that the cache flushes older pages before it flushes younger pages, and
wherein processing a page for delayed flushing causes the page to age at a slower rate whereas processing a page for less-delayed flushing causes the page to age at a faster rate.

16. The computer program product of claim 15,
wherein the data storage system stores the data object in a file system, the file system having a physical address space backed by the persistent storage, and
wherein each of a set of ranges of contiguous physical addresses in the file system is backed by a respective range of contiguous storage locations in the persistent storage.

17. The computer program product of claim 15, wherein identifying the target location to which each of the set of pages will be flushed includes mapping a logical address to which host data in that page is directed to a corresponding physical address in the file system at which that host data will be placed.

18. The computer program product of claim 17,
wherein at least a portion of the file system is rendered as a set of windows, each window including a range of contiguous physical addresses in the file system backed by a corresponding range of contiguous storage locations in the persistent storage, and
wherein providing the coalesce-expected flag for a page includes asserting the coalesce-expected flag in response to the physical address in the file system to which that page is mapped residing within a window that has free space.

19. The computer program product of claim 18,
wherein the cache arranges pages into groups using reference structures, each reference structure pointing to multiple pages and aligning with a respective range of contiguous physical address space in the file system, and
wherein the method further includes flushing pages pointed to by a reference structure by flushing all pages pointed to by that reference structure together at one time.

20. The computer program product of claim 19, wherein a reference structure is made to point to a cache page in response to performing a rename operation on that cache page that identifies a mapped location in the file system to which that reference structure is aligned, and wherein the reference structure is made to point to additional cache pages over time as additional rename operations map pages to other physical addresses to which that reference structure is aligned.

* * * * *